(12) United States Patent
Schwingshackl et al.

(10) Patent No.: US 8,411,871 B2
(45) Date of Patent: Apr. 2, 2013

(54) ECHO CANCELLATION

(75) Inventors: David Schwingshackl, Villach (AT);
Joerg Hauptmann, Wernberg (AT);
Gerhard Paoli, Villach (AT); Dietmar Straeussnigg, Villach (AT)

(73) Assignee: Lantiq Deutschland GmbH, Neubiberg (DE)

(*) Notice: Subject to any disclaimer, the term of this patent is extended or adjusted under 35 U.S.C. 154(b) by 1528 days.

(21) Appl. No.: 11/842,964

(22) Filed: Aug. 22, 2007

(65) Prior Publication Data

US 2009/0052683 A1 Feb. 26, 2009

(51) Int. Cl.
*H04B 3/20* (2006.01)

(52) U.S. Cl. .......... 381/66; 381/99; 381/94.1; 381/93; 381/11; 381/13; 381/92; 381/95; 379/95.05; 379/406.05; 379/406.11; 704/221; 704/226

(58) Field of Classification Search ............... 381/66, 381/99, 94.1, 93, 11, 13, 92, 95; 379/93.05, 379/406.05, 406.11; 375/222; 370/286; 704/221, 226

See application file for complete search history.

(56) References Cited

U.S. PATENT DOCUMENTS

| | | | | |
|---|---|---|---|---|
| 3,787,645 | A * | 1/1974 | Ochiai et al. | 379/406.11 |
| 5,428,605 | A * | 6/1995 | Andre | 370/290 |
| 5,737,408 | A * | 4/1998 | Hasegawa | 379/406.05 |
| 5,999,828 | A * | 12/1999 | Sih et al. | 455/570 |
| 6,580,696 | B1 * | 6/2003 | Chen et al. | 370/286 |
| 6,618,480 | B1 * | 9/2003 | Polley et al. | 379/406.05 |
| 6,904,146 | B2 * | 6/2005 | Domer et al. | 379/406.01 |
| 7,009,945 | B1 * | 3/2006 | Tang et al. | 370/286 |
| 7,062,038 | B1 * | 6/2006 | McLaughlin et al. | 379/406.08 |
| 7,120,130 | B2 * | 10/2006 | Bina et al. | 370/286 |
| 7,134,118 | B1 * | 11/2006 | McNutt | 717/138 |
| 7,519,109 | B2 * | 4/2009 | Del Toso et al. | 375/222 |
| 2003/0147526 | A1 * | 8/2003 | Oswal et al. | 379/406.01 |
| 2008/0085009 | A1 * | 4/2008 | Merks et al. | 381/66 |

OTHER PUBLICATIONS

Milosevic et al, Fast Unbiased Echo Canceller Update during ADSL Transmission, 2003,IEEE Transaction on Communication, vol. 51, issue 4 ,p. 561-565.*

* cited by examiner

*Primary Examiner* — Davetta W Goins
*Assistant Examiner* — Kuassi Ganmavo
(74) *Attorney, Agent, or Firm* — SpryIP, LLC

(57) ABSTRACT

Implementations related to echo cancellation are depicted and described herein.

19 Claims, 2 Drawing Sheets

ECHO CANCELLATION

BACKGROUND

In communication systems, transceivers often transmit and receive signals simultaneously in separated frequency bands. Typically, the amplitude of the transmit signal is higher than the receive signal causing problems because a portion of the transmission signal, which is referred to as echo, may leak from the transmit path into the receive path of the transceiver. As the frequency bands for transmitting and receiving are separated, filtering of the receive signal may eliminate at least a portion of the echo signals leaking from the transmit signals to the receive signals. However, even with separated frequency bands and filtering, echo signals may influence the receive signals at frequency close to the band separation mainly due to overlapping of the receive and transmit frequency bands caused for example by side bands etc. generated during the signal processing.

The echo signal adding to the receive signal may be eliminated or at least reduced by providing echo cancellation for the transceiver. In echo cancellation, the echo signal leaking from the transmit to the receive path is replicated based on the transmit signal and the replicated echo signal is subtracted from the receive signal to obtain a compensated receive signal.

Echo cancellation may for example be implemented by providing an echo path from the transmit path to the receive path. At the transmit side, the transmit signal or a copy of the transmit signal is provided to an echo cancellation filter. The filtering coefficients of the filter are selected or adjusted to obtain at the output of the filter a dublicate of the echo signal representing or closely representing the echo signal. The dublicate of the echo signal is then introduced to a subtracting node in the receive path for compensating the receive signal.

The echo cancellation path may be provided in pure digital domains of the transceiver, i.e. the input signal of the echo path is tapped from a digital domain of the transmit path and the dublicate of the echo signal is introduced to a digital domain of the receive path for compensating. The echo cancellation path can also be provided in pure analog domains, i.e. the input signal of the echo path is tapped from an analog domain of the transmit path and the echo signal dublicate is introduced to an analog domain of the receive path. Furthermore, the echo cancellation path may introduce the replica of the echo signal to a node in an analog domain, but the input signal for the analog signal may be tapped from a digital domain. A digital-to-analog converter (D/A converter) is provided in the echo cancellation path, typically after a digital echo cancellation filter. While in this case, the echo path comprises digital and analog components, it may be classified still as an analog compensation path because the compensation signal is provided in an analog part of the receive path.

DETAILED DESCRIPTION

The following detailed description explains exemplary embodiments of the present invention. The description is not to be taken in a limiting sense, but is made only for the purpose of illustrating the general principles of embodiments of the invention while the scope of protection is only determined by the appended claims.

In the various figures, identical or similar entities, modules, devices etc. may have assigned the same reference number.

Figure 1:
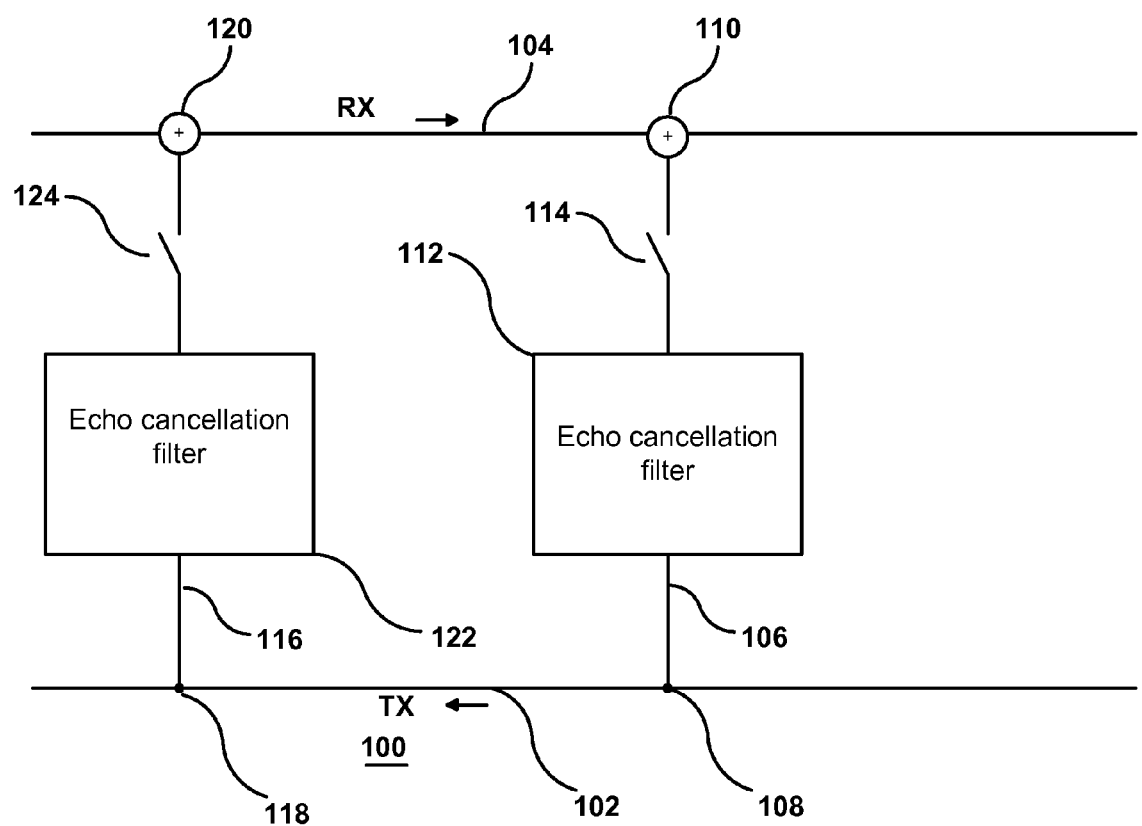
FIG. 1 shows a block diagram according to an embodiment of the present invention.

Referring now to FIG. 1, a first embodiment of the present invention is shown wherein a transceiver circuit 100 comprises a transmit path 102 and a receive path 104. A first echo cancellation path 106 is coupled to a node 108 of the transmit path 102 and to a summing node 110 of the receive path 104. The first echo cancellation path 106 comprises a first echo cancellation filter 112 to filter a replica of the transmit signal tapped at node 108. An output of the first echo cancellation filter 112 is coupled to a first device 114 provided to activate or deactivate the first echo cancellation path. According to embodiments, the first device 114 may be a switch, a switching logic circuitry or other circuitry capable of selectively activating or deactivating the first echo cancellation path. The first device 114 is further coupled to the summing node 110 to provide a cancellation signal to summing node 110.

A second echo cancellation path 116 is coupled to a node 118 of the transmit path 102 and to a summing node 120 of the receive path 104. The second echo cancellation path 116 comprises a second echo cancellation filter 122 to filter a replica of the transmit signal tapped at node 118. An output of the second echo cancellation filter 122 is coupled to a second device 124 to allow selective activating or deactivating of the second echo cancellation path. According to one embodiment, the second device 124 may be a switch, a switching logic circuitry or other circuitry capable of performing selectively activating or deactivating of the second echo cancellation path. The device 124 is further coupled to the summing node 120 to provide a cancellation signal to summing node 120.

The first and second echo cancellation filters may be both digital filters. The first and second echo cancellation filters may be adaptive filters. Adapting the filter coefficients may be provided continuously during transceiving operation or only during initializiation or training.

With the above described transceiver circuit 100, echo cancellation in the receive path can be tailored to the operation of the transceiver circuit 100, as will be described in more details set forth below. According to one embodiment, based on whether the transceiver circuit 100 is in a first transceiving operation mode, the first and second devices are switched into a first switching configuration in which the first echo cancellation path 104 is activated, i.e. coupled to the receive path and the second echo cancellation path is deactivated, i.e. decoupled from the receive path. According to embodiments, the first switching configuration may be set when the transceiving operation mode is in accordance with a predefined telecommunication standard, i.e. when the transceiver circuit 100 transmits and receives data according to a predefined telecommunication standard. According to embodiments, the transceiver 100 may be a wireless transceiver and the predefined telecommunication standard may include wireless standards like Bluetooth, GSM, WLAN, Wi-Fi, WiMAx etc. According to other embodiments, the transceiver 100 may be a transceiver for wired communication such as a transceiver for DSL communication. In the later case, the predefined telecommunication standard may include but is not limited to the standards of ADSL, VDSL, SDSL, HDSL, SHDSL etc.

The first echo cancellation path 106 may be different from the second echo cancellation path 116 with regards to the structure and operating capabilities of each echo cancellation path. For example, according to one embodiment, the first echo cancellation path 106 may be a digital cancellation path and the second echo cancellation path 116 may be an analog cancellation path. According to one embodiments described below with respect to FIG. 2, the analog cancellation path may comprise an adaptive digital filter and a D/A converter for converting the digital output signal of the filter to an analog signal for providing analog echo compensation. Furthermore, according to other embodiments, the first echo cancellation filter 112 may be an adaptive digital filter configured to continuously adjust the filtering coefficients during transceiving operation (showtime) while the second echo cancellation filter 122 is an adaptive digital filter configured to adjust the filtering coefficients only during a training or initialization phase and maintains thereafter the filtering coefficients during the normal transceiving operation. In other embodiments, the first and second echo cancellation filter 112 may be an adaptive digital filter configured to be capable of adjusting coefficients during training or initialization phase and continuously during transceiving operation (showtime). Furthermore, the first and second echo cancellation filters may be different in design, structure and operating capabilities. For example, the first and second echo cancellation filters may be adaptive digital filters using different algorithms for adapting the filtering coefficients resulting in different computational and time requirements for adaption of the filtering coefficients. According to embodiments, both of the first and second echo cancellation filters 112 and 122 may be implemented as FIR filters (finite impulse response filters) while according to other embodiments, one of the first and second echo cancellation filters may be implemented as a FIR filter while the other echo cancellation filter is implemented as an IIR filter (infinite impulse response filter). In addition, the first and second echo cancellation filters may provide for different orders of filtering.

With the above described activating of one echo cancellation path and deactivating of the other echo cancellation path, an echo cancellation tailored to the transceiving operation of the transceiver circuit can be achieved. For example, if one digital echo cancellation filter has a faster adaption time than the other, by deactivating one of the echo cancellation paths an adaption of the filter in short time may be obtained during transceiving operation compared to a configuration where both echo cancellation paths are operable.

Furthermore, in different telecommunication standards the requirements for echo cancellation are different due to the use of different transmit and receive frequency bands. According to a first telecommunication standard, transmission may be provided in at least a first frequency band and receiving may be provided in at least a second frequency band separated from the first band while according to a second telecommunication standard transmission may be provided in a at least a third frequency band and receiving may be provided in at least a fourth frequency band separated from the third band such that both receive bands, i.e. the first and second frequency band, and both transmit bands are different. However in other embodiments, the receiving and transmitting frequency bands are allowed to overlap. In a transceiving operation according to a first telecommunication standard with transmit and receive frequency bands at low frequencies, a significant reduction of the echo in the receive signal can be achieved by providing an analog filter at the input of the receive path while for a transceiving operation according to a second telecommunication standard with transmit and receive bands at both high and low frequencies, analog filtering at the input of the receive paths is less efficient. In the first case, echo cancellation in both, the digital domain and analog domain of the receive path may be preferable while in the second case, echo cancellation in the analog domain may be preferable. This can be taken into account by providing the devices 114, 124 in a first switching configuration during a transceiving datas according to the first telecommunication standard (for example an ADSL standard), wherein the first switching configuration activates the first echo cancellation path 104 to provide echo cancellation in the digital domain and deactivates the second echo cancellation path. During data transceiving according to the second telecommunication standard (for example a VDSL standard), the devices 114, 124 are then switched to a second switching configuration wherein the first echo cancellation path 104 is deactivated and the second echo cancellation path is activated to provide echo cancellation in the analog domain.

In addition to the above described tailoring, operating only one of the echo cancellation paths further allows reducing the power consumption compared to an operation of both echo cancellation paths.

While the transceiver circuit 100 of FIG. 1 shows the first and second devices 114 and 124 arranged between the summing nodes and the echo cancellation filter, it is to be noted that the devices 114 and 124 might be placed at other positions in the respective echo cancellation paths, for example between nodes 108, 118 and the echo cancellation filters 112, 122, respectively. Furthermore, in other embodiments, activating or deactivating of the echo cancellation path may be provided by activating or deactivating components in the echo cancellation path. To this end, the devices 114 and 124 may be coupled to the respective components, for example filters, D/A converters etc.

Figure 2:
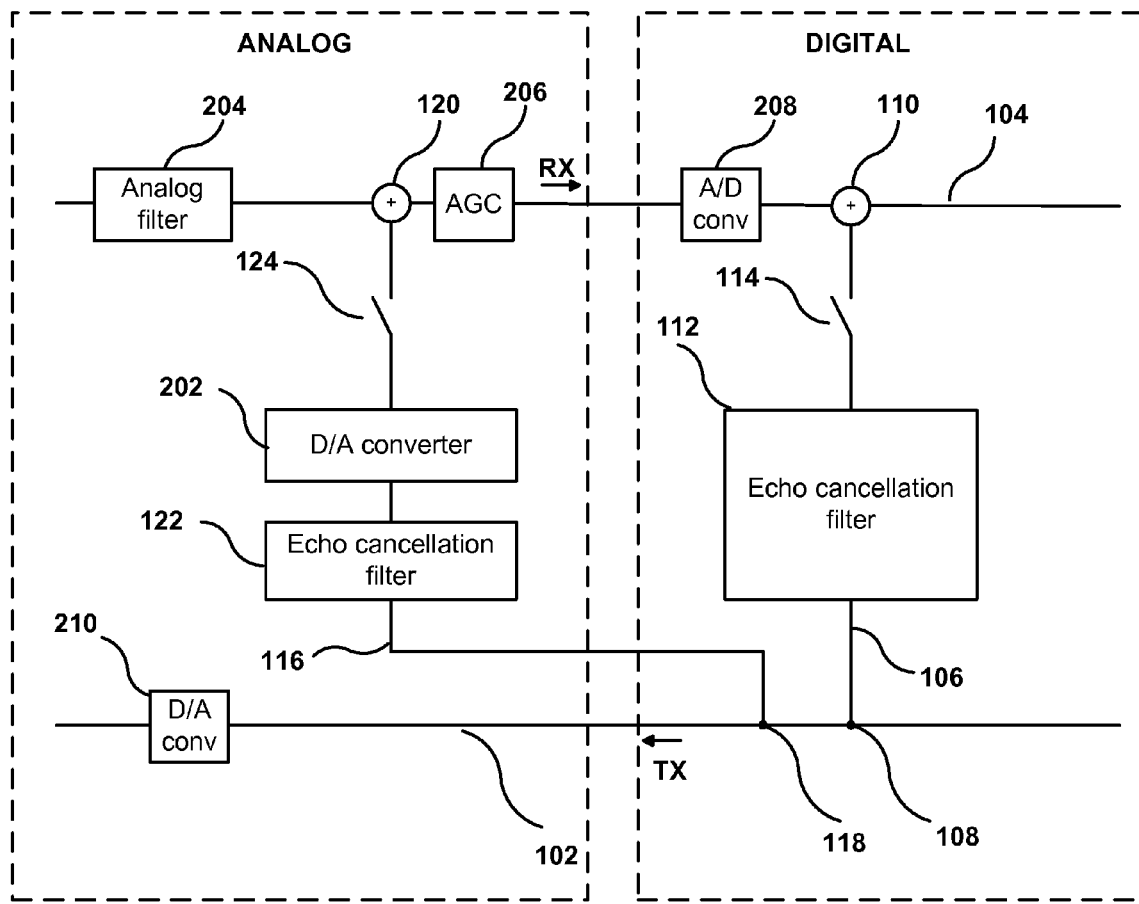
FIG. 2 shows a block diagram according to an embodiment of the present invention.

Referring now to FIG. 2, a further embodiment of the present invention will be described wherein one of the echo cancellation path provides digital echo cancellation and one echo cancellation path provides analog echo cancellation.

In a transceiver circuit 200 shown in FIG. 2, the first echo cancellation path 106 is implemented to provide digital echo cancellation and the second echo cancellation path 116 is implemented to provide analog echo cancellation. The second cancellation path 116 receives at node 118 a digital representation of the transmit signal. The digital representation is provided to the echo cancellation filter 122. An output of the echo cancellation filter 122 is coupled to an input of a D/A converter 202. The D/A converter 202 is coupled via device 124 to summing node 120 to provide an analog signal based on the received digital signal for echo cancellation in the receive path 104. As can be seen in FIG. 2, summing node 120 is arranged within the analog domain of receive path 104 to provide an analog echo cancellation.

In the embodiment according to FIG. 2, an analog filter 204 is arranged in the receive path to provide a coarse echo filtering. Analog filter 204 is coupled to the node 120 to transfer the filtered receive signal to node 120. Analog filter 204 may comprise for example a RC bridge, and the filter may be adjusted or adapted by switching the values of the resistance or capacitance components of the RC bridge. Analog filter 204 may be integrated with other components for example a hybrid circuit.

The receive path 104 further comprises an automatic gain control circuit (AGC circuit) 206 in the analog region of the receive signal. As shown in FIG. 2, the automatic gain control circuit 206 is provided between node 120 and an input of an analog-to-digital converter (A/D converter) 208. The output of A/D converter 208 is coupled to node 110 located in the digital domain of the receive path 104.

The transceiver circuit 200 further comprises in the transmit path 102 a D/A converter 210 to convert the digital transmit signal into an analog transmit signal.

It is to be noted that the transmit and receive path may be coupled to further components for transmitting the analog signals to remote transceivers, for example hybrid circuits, antennas etc.

It is further to be noted that the transmit paths, receive paths and echo cancellation paths may comprise in addition to the components shown in FIG. 2 other components such as additional filters, amplifiers, AGC circuits etc. For example, in addition to the AGC circuit 206 provided between the nodes 110 and 120, an additional AGC circuit 206 may be provided between the analog filter 204 and the node 120.

The echo cancellation filters 112 and 122 may be programmable digital filters, adaptive digital filters or combinations thereof. Adapting of the filter coefficients may be achieved by providing a feedback loop from the digital domain of the receive path to a control input of the echo cancellation filters 112 and 122. Furthermore, the echo cancellations filters 112 and 122 may be implemented as FIR filters (finite impulse response filters) or IIR filters (infinite impulse response filters).

To control the settings of the first and second devices, a controller may be coupled to the first and second device. The controller may be configured to activate the first echo cancellation path and deactivate the second echo cancellation path in a first transceiving operation mode and deactivate the first echo cancellation path and activate the second echo cancellation path in a second transceiving mode as described above.

The controller may automatically determine information related to an transceiving operation mode and set the first and second device correspondingly. However, according to other embodiments, the setting of the first and second devices may be externally programmable by a user or operator, for example by programming a register and permanently store the settings provided therein.

While FIG. 2 shows the device 124 separated from the D/A converter 202, it is to be noted that the device 124 may in other embodiments be integrated within D/A converter to activate or deactivate the echo cancellation path by activating or deactivating the D/A converter 202.

In the above, embodiments of the present invention have been disclosed. While a particular feature or aspect of an embodiment of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". The terms "coupled" and "connected", along with derivatives may have been used. It should be understood that these terms may have been used to indicate that two elements co-operate or interact with each other regardless whether they are in direct physical or electrical contact, or they are not in direct contact with each other. Furthermore, it should be understood that embodiments of the invention may be implemented in discrete circuits, partially integrated circuits or fully integrated circuits or programming means. Also, the term "exemplary" is merely meant as an example, rather than the best or optimal. It is also to be appreciated that features and/or elements depicted herein are illustrated with particular dimensions relative to one another for purposes of simplicity and ease of understanding, and that actual dimensions may differ substantially from that illustrated herein.

What is claimed is:

1. A method comprising:
providing a first echo cancellation path, the first echo cancellation path comprising a first echo cancellation filter;
providing a second echo cancellation path, the second echo cancellation path comprising a second echo cancellation filter;
activating the first echo cancellation path and deactivating the second echo cancellation path in a first transceiving operation mode associated with a first telecommunication standard;
activating the second echo cancellation path and deactivating the first echo cancellation path in a second transceiving operation mode associated with a second telecommunication standard; and
deactivating the first or second echo cancellation path based on a time to adapt filter coefficients associated with the first and second echo cancellation filters.

2. The method according to claim 1, wherein the first operation mode comprises transmitting data in at least a first frequency band and receiving data in at least a second frequency band and wherein the second transceiving operation mode comprises transmitting data in at least a third frequency band and receiving data in at least a fourth frequency band, wherein the first frequency band is different from the third frequency band and the second frequency band is different from the fourth frequency band, wherein the first and second frequency band are separated or partially overlapping and wherein the third and fourth frequency band are separated or partially overlapping.

3. The method according to claim 1, wherein the first and second cancellation filters are digital cancellation filters and wherein the second cancellation path comprises a D/A converter, the D/A converter comprising an input coupled to an output of the second digital cancellation filter and an input coupled to an analog part of a receiving path.

4. An apparatus comprising:
a first echo cancellation path, the first echo cancellation path comprising a first echo cancellation filter;
a second echo cancellation path, the second echo cancellation path comprising a second echo cancellation filter;
a first device to selectively activate and deactivate the first echo cancellation path;
a second device to selectively activate and deactivate the second echo cancellation path,
wherein deactivating the first or second echo cancellation path is based on a time to adapt filter coefficients associated with the first and second echo cancellation filters.

5. The apparatus according to claim 4, wherein the first echo cancellation path is implemented as a digital echo cancellation path and wherein the second echo cancellation path is implemented as an analog echo cancellation path.

6. The apparatus according to claim 5, wherein the first and second echo cancellation filters are implemented as digital echo cancellation filters and wherein the second echo cancellation path comprises a D/A converter.

7. The apparatus according to claim 4, wherein the first and second echo cancellation filters are configured to adapt filter coefficients during initialization and/or during transceiving.

8. The apparatus according to claim 4, further comprising a controller to control the setting of the first and second device.

9. The apparatus according to claim 4, further comprising a controller to set the first and second device, the controller being configured to activate the first echo cancellation path and deactivate the second echo cancellation path in a first operation mode.

10. The apparatus according to claim 9, wherein the controller automatically determines information related to an operation mode and sets the first and second device correspondingly.

11. The apparatus according to claim 9, wherein the controller comprises a programmable register to permanently store settings for the first and second device.

12. A transceiver circuit comprising:
a transmit path;
a receive path;
a first echo cancellation path, the first echo cancellation path comprising a first echo cancellation filter;
a second echo cancellation path, the second echo cancellation path comprising a second echo cancellation filter;
a first device to selectively couple and decouple the first echo cancellation path with the receive path;
a second device to selectively couple and decouple the second echo cancellation path with the receive path,
wherein deactivating the first or second echo cancellation path is based on a time to adapt filter coefficients associated with the first and second echo cancellation filters.

13. The transceiver circuit according to claim 12, wherein the first echo cancellation path is implemented as a digital echo cancellation path and wherein the second echo cancellation path is implemented as an analog echo cancellation path.

14. The transceiver circuit according to claim 13, wherein the first and second echo cancellation filters are implemented as digital echo cancellation filters and wherein the second echo cancellation path comprises a D/A converter.

15. The transceiver circuit according to claim 12, wherein the first and second echo cancellation filters are configured to adapt filter coefficients during initialization and/or during transceiving.

16. The transceiver circuit according to claim 12, further comprising a controller to control the setting of the first and second device.

17. The transceiver circuit according to claim 12, further comprising a controller to set the first and second device, the controller being configured to activate the first echo cancellation path and deactivate the second echo cancellation path in a first transceiving operation mode.

18. The transceiver circuit according to claim 16, wherein the controller automatically determines information related to an operation mode of the transceiver circuit and sets the first and second device based on the determined information.

19. The transceiver according to claim 16, wherein the controller comprises a programmable register to externally program and permanently store settings for the first and second device.

* * * * *